United States Patent
Malik

(10) Patent No.: US 7,825,804 B2
(45) Date of Patent: Nov. 2, 2010

(54) METHODS AND APPARATUS FOR OPPORTUNISTIC LOCATIONING OF RF TAGS USING LOCATION TRIGGERS

(75) Inventor: Ajay Malik, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 932 days.

(21) Appl. No.: 11/669,641

(22) Filed: Jan. 31, 2007

(65) Prior Publication Data

US 2008/0180246 A1    Jul. 31, 2008

(51) Int. Cl.
G08B 13/14 (2006.01)
H04Q 5/22 (2006.01)
G08C 19/00 (2006.01)

(52) U.S. Cl. .................. 340/572.1; 340/10.3; 340/10.4; 340/10.41; 340/825.65; 340/10.1

(58) Field of Classification Search ............... 340/572.1, 340/573.1
See application file for complete search history.

(56) References Cited

U.S. PATENT DOCUMENTS 6,686,830 B1 *   2/2004   Schirtzer .................. 340/10.2
6,982,646 B2 *   1/2006   Rodgers et al. .......... 340/572.7
7,019,651 B2 *   3/2006   Hall et al. ................ 340/572.7
7,030,761 B2 *   4/2006   Bridgelall et al. ........ 340/572.2
7,406,320 B1 *   7/2008   Kumar et al. ............. 455/456.1

* cited by examiner

Primary Examiner—Daniel Wu
Assistant Examiner—Pameshanand Mahase

(57) ABSTRACT

An RFID system provides opportunistic locationing of RFID tags and associated assets in environments where multiple tags are read from multiple readers. A radio frequency identification (RFID) system includes one or more location triggers and a first RFID reader coupled to the network having a first antenna associated therewith. The first reader is configured to read a first set of tag IDs from a first set of RFID tags within a first range of the first antenna. A second RFID reader is coupled to the network and has a second antenna associated therewith. The second RFID reader is configured to read a second set of tag IDs from a second set of RFID tags within a second range of the second antenna. An RF switch is coupled to the network and is configured to receive the first set of tag IDs and the second set of tag IDs from the first RFID reader and the second RFID reader. The RF switch is configured to reconcile the location of an asset having a particular tag ID when the particular tag ID is an element of both the first set of tag IDs and the second set of tag IDs.

9 Claims, 2 Drawing Sheets

METHODS AND APPARATUS FOR OPPORTUNISTIC LOCATIONING OF RF TAGS USING LOCATION TRIGGERS

TECHNICAL FIELD

The present invention relates generally to radio frequency identification (RFID) systems, wireless local area networks (WLANs), and other such networks incorporating RF tags, and, more particularly, to methods of determining the location of RF tags (such as passive, active semi-passive, Zigbee, 802.11 or combination tags) in a large network.

BACKGROUND

Due the size of modern wireless networks, it has become difficult to plan, monitor, manage, and troubleshoot the system as a whole as well as the individual radio frequency (RF) elements. For example, radio frequency identification (RFID) systems have achieved wide popularity in a number of applications, as they provide a cost-effective way to track the location of a large number of assets in real time. In large-scale application such as warehouses, retail spaces, and the like, many types of tags may exist in the environment. Likewise, multiple types of readers, such as RFID readers, active tag readers, 802.11 tag readers, Zigbee tag readers, etc., are typically distributed throughout the space in the form of entryway readers, conveyer-belt readers, mobile readers, etc., and may be linked by network controller switches and the like.

Similarly, there has been a dramatic increase in demand for mobile connectivity solutions utilizing various wireless components and wireless local area networks (WLANs). This generally involves the use of wireless access points that communicate with mobile devices using one or more RF channels (e.g., in accordance with one or more of the IEEE 802.11 standards).

The number of mobile units and associated access ports, as well as the number of RFID readers and associated antennae, can be very large in an enterprise. As the number of components increases, the management and configuration of those components becomes complicated and time-consuming.

For example, it is not unusual for assets to have multiple attached RFID tags. These tags each may be of a different type—i.e., active, passive, or semi-active. In many cases, these tags will share a single tag ID, which is associated with the particular asset. Since a warehouse, office building, or other such location may have many different RFID readers distributed throughout the environment, and since these RFID readers may have overlapping ranges and multiple antennas, it is not uncommon to generate (and send over the network) voluminous tag information associated with the location of assets—some of which may be contradictory. For example, a passive tag on an asset may be read by an RFID reader in the same room where the asset resides, while an active tag on the same asset may be read by an RFID reader (e.g., an access port of 802.11 device) in the next room or even upstairs. Any enterprise applications trying to reconcile this locationing information will have great difficulty in determining where the asset is actually located.

Accordingly, it is desirable to provide improved methods and systems for determining the location of assets in environments where multiple tags may be used on a single asset, and those tags may be read by a number of readers. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides systems and methods for opportunistic locationing of RFID tags and associated assets in environments where multiple tags are read from multiple readers. A radio frequency identification (RFID) system in accordance with one embodiment includes one or more location triggers (e.g., dynamic location triggers and/or static location triggers), a first RFID reader coupled to the network and having a first antenna associated therewith, the first reader configured to read a first set of tag IDs from a first set of RFID tags within a first range of the first antenna; a second RFID reader coupled to the network and having a second antenna associated therewith; the second RFID reader configured to read a second set of tag IDs from a second set of RFID tags within a second range of the second antenna; and an RF switch coupled to the network and configured to receive the first set of tag IDs and the second set of tag IDs from the first RFID reader and the second RFID reader; the RF switch configured to reconcile, using a locationing algorithm, the location of an asset having a particular tag ID when the particular tag ID is an element of both the first set of tag IDs and the second set of tag IDs. The locationing algorithm adapts in accordance with information received from the dynamic and/or static location triggers.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, network control, the 802.11 family of specifications, wireless networks, RFID systems and specifications, and other functional aspects of the system (and the individual operating components of the system) may not be described in detail herein. Furthermore, the connecting lines shown in the various figures contained herein are intended to represent example functional relationships and/or physical couplings between the various elements. Many alternative or additional functional relationships or physical connections may be present in a practical embodiment.

Without loss of generality, in the illustrated embodiment, many of the functions usually provided by a traditional access point (e.g., network management, wireless configuration, etc.) and/or traditional RFID readers (e.g., data collection, RFID processing, etc.) are concentrated in a corresponding RF switch. It will be appreciated that the present invention is not so limited, and that the methods and systems described herein may be used in conjunction with traditional access points and RFID readers or any other device that communicates via RF channels.

Figure 1:
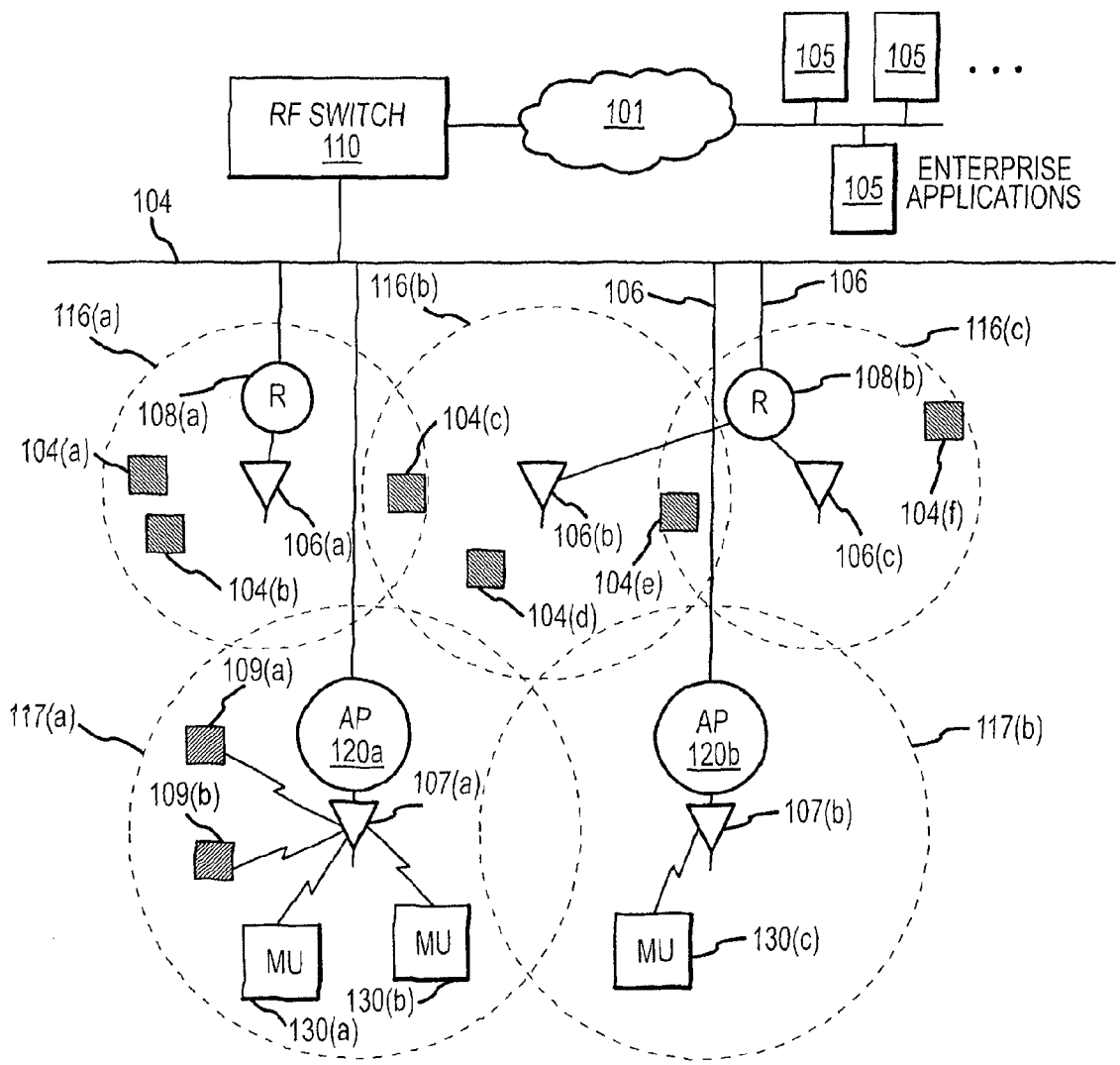
FIG. 1 is a conceptual overview of a system in accordance with an exemplary embodiment of the present invention.

The present invention generally relates to an opportunistic locationing system wherein a locationing algorithm adapts in accordance with information received from the dynamic and/or static location triggers. Referring to FIG. 1, in an example system useful in describing the present invention, a switching device 110 (alternatively referred to as an "RF switch," "WS," or simply "switch") is coupled to a network 101 and 104 (e.g., an Ethernet network coupled to one or more other networks or devices) which communicates with one or more enterprise applications 105. One or more wireless access ports 120 (alternatively referred to as "access ports" or "APs") are configured to wirelessly connect to one or more mobile units 130 (or "MUs"). APs 120 suitably communicate with switch 110 via appropriate communication lines 106 (e.g., conventional Ethernet lines, or the like). Any number of additional and/or intervening switches, routers, servers and other network components may also be present in the system.

A number of RF tags ("RFID tags," or simply "tags") 104, 107 are distributed throughout the environment. These tags, which may be of various types, are read by a number of RFID readers (or simply "readers") 108 having one or more associated antennas 106 provided within the environment. The term "RFID" is not meant to limit the invention to any particular type of tag. The term "tag" refers, in general, to any RF element that can be communicated with and has an ID (or "ID signal") that can be read by another component. Readers 108, each of which may be stationary or mobile, are suitably connective via wired or wireless data links to a RF switch 110.

A particular AP 120 may have a number of associated MUs 130. For example, in the illustrated topology, MUs 130(a) and 130(b) are associated with AP 120(a), while MU 130(c) is associated with AP 120(b). One or more APs 120 may be coupled to a single switch 110, as illustrated.

RF Switch 110 determines the destination of packets it receives over network 104 and 101 and routes those packets to the appropriate AP 120 if the destination is an MU 130 with which the AP is associated. Each WS 110 therefore maintains a routing list of MUs 130 and their associated APs 130. These lists are generated using a suitable packet handling process as is known in the art. Thus, each AP 120 acts primarily as a conduit, sending/receiving RF transmissions via MUs 130, and sending/receiving packets via a network protocol with WS 110.

AP 120 is typically capable of communicating with one or more MUs 130 through multiple RF channels. This distribution of channels varies greatly by device, as well as country of operation. For example, in one U.S. embodiment (in accordance with 802.11(b)) there are fourteen overlapping, staggered channels, each centered 5 MHz apart in the RF band.

RF switch 110 can support any number of tags that use wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

A particular RFID reader 108 may have multiple associated antennas 106. For example, as shown in FIG. 1, reader 108(a) is coupled to one antenna 106(a), and reader 108(b) is coupled to two antennas 106(b) and 106(c). Reader 108 may incorporate additional functionality, such as filtering, cyclic-redundancy checks (CRC), and tag writing, as is known in the art.

In general, RFID tags (sometimes referred to as "transponders") may be classified as either active, passive, or semi-active. Active tags are devices that incorporate some form of power source (e.g., batteries, capacitors, or the like) and are typically always "on," while passive tags are tags that are exclusively energized via an RF energy source received from a nearby antenna. Semi-active tags are tags with their own power source, but which are in a standby or inactive mode until they receive a signal from an external RFID reader, whereupon they "wake up" and operate for a time just as though they were active tags. While active tags are more powerful, and exhibit a greater range than passive tags, they also have a shorter lifetime and are significantly more expensive. Such tags are well known in the art, and need not be described in detail herein.

Each antenna 106 has an associated RF range (or "read point") 116, which depends upon, among other things, the strength of the respective antenna 106. The read point 116 corresponds to the area around the antenna in which a tag 104 may be read by that antenna, and may be defined by a variety of shapes, depending upon the nature of the antenna (i.e., the RF range need not be circular or spherical as illustrated in FIG. 1). An antenna 107 coupled to an AP 120 may also communicate directly with RFID tags (such as tags 109(a) and 109(b), as illustrated).

It is not uncommon for RF ranges or read points to overlap in real-world applications (e.g., doorways, small rooms, etc.). Thus, as shown in FIG. 1, read point 116(a) overlaps with read point 116(b), which itself overlaps with read point 116(c). Accordingly, it is possible for a tag to exist within the range of two or more readers simultaneously. For example, tag 104(c) falls within read points 116(a) and 116(b), and tag 104(f) falls within read points 116(b) and 116(c). Because of this, two readers (108(a) and 108(b)) may sense the presence of (or other event associated with) tag 104(c).

As described in further detail below, switch 102 includes hardware, software, and/or firmware capable of carrying out the functions described herein. Thus, switch 102 may comprise one or more processors accompanied by storage units, displays, input/output devices, an operating system, database management software, networking software, and the like. Such systems are well known in the art, and need not be described in detail. Switch 102 may be configured as a general purpose computer, a network switch, or any other such network host. In a preferred embodiment, controller 102 is modeled on a network switch architecture but includes RF network controller software (or "module") whose capabilities include, among other things, the ability to allow configure and monitor readers 108 and antennas 106.

RF switch 110 allows multiple read points 116 to be logically combined, via controller 102, within a single read point zone (or simply "zone"). For example, referring to FIG. 1, a read point zone 120 may be defined by the logical union of read points 116(*a*), 116(*b*), and 116(*c*). Note that the read points need not overlap in physical space, and that disjoint read points (e.g., read point 116(*d*)) may also be included in the read point zone if desired. In a preferred embodiment, antennas (i.e., read points defined by the antennas) can be arbitrarily assigned to zones, regardless of whether they are associated with the same reader. That is, referring to FIG. 1, antennas 106(*b*) and 106(*c*), while both associated with reader 108(*b*), may be part of different zones. Controller 102 then receives all tag data from readers 108 via respective data links 103 (e.g., wired communication links, 802.11 connections, or the like), then aggregates and filters this data based on zone information. The read point zones are suitably preconfigured by a user or administrator. That is, the user is allowed to access controller 110 and, through a configuration mode, specify a set of read points that are to be included in a particular zone. RF switch 110. includes a cell controller (CC) and an RFID network controller (RNC), In general, the RNC includes hardware and software configured to handle RFID data communication and administration of the RFID network components, while the CC includes hardware and software configured to handle wireless data (e.g., in accordance with IEEE 802.11) from the mobile units and access ports within wireless cells. In one embodiment, RF switch 110 includes a single unit with an enclosure containing the various hardware and software components necessary to perform the various functions of the CC and RNC as well as suitable input/output hardware interfaces to networks 101 and 104.

Figure 2:
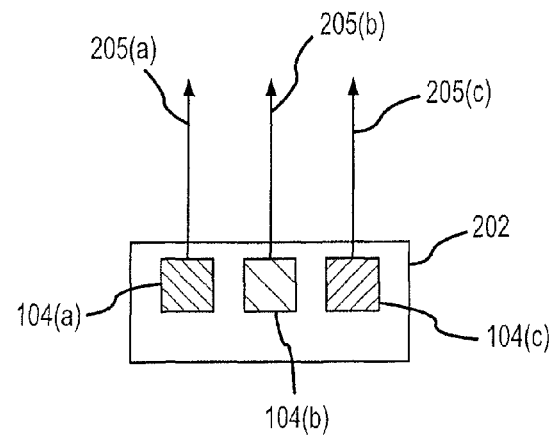
FIG. 2 is a conceptual drawing of an asset with three types of RFID tags attached thereto.

As mentioned above, the present invention relates to opportunistic locationing of assets having one or more RFID tags attached thereto, wherein the locationing algorithm is modified based on information received from one or more location triggers. That is, a particular asset might have multiple RFID tags of the same or different type attached thereto. Referring to FIG. 2, for example, an asset 202—which might be a box, a package, a computer, or any other object—has three tags 104(*a*)-(*c*) attached thereto. In the illustrated embodiment, tag 104(*a*) is a passive tag, tag 104(*b*) is an active tag, and tag 104(*c*) is a semi-active tag. Each tag produces a respective signal (containing at least a tag ID), 205(*a*)-(*c*).

Figure 3:
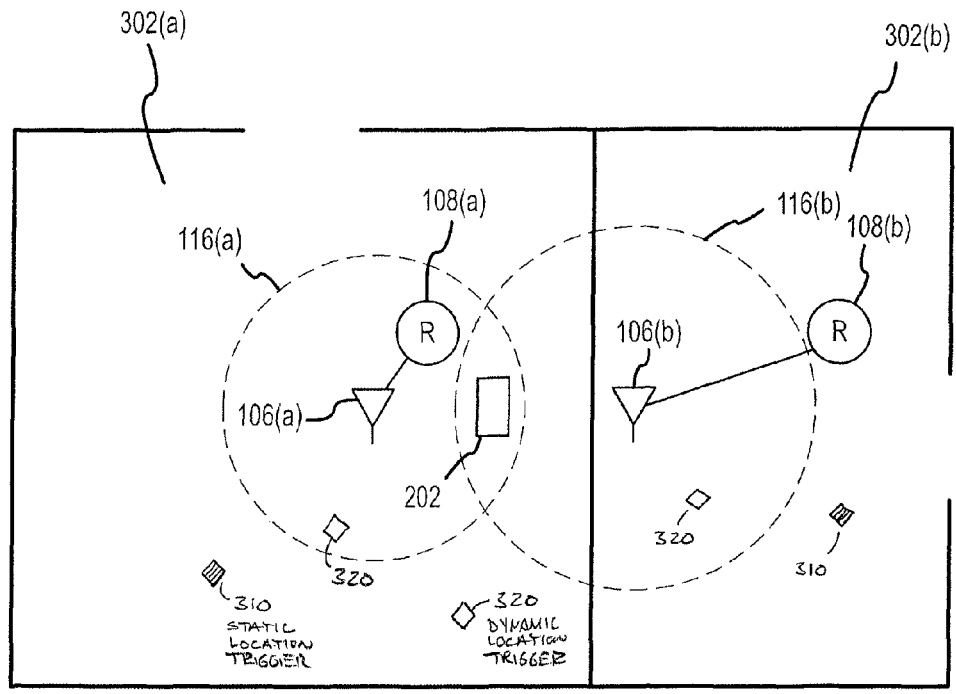
FIG. 3 is a conceptual drawing of two RFID readers interacting with an asset such as that shown in FIG. 2.

When asset 202 is placed in an environment having multiple readers, these readers can generate apparently contradictory locationing information. FIG. 3 shows a simplified example, wherein for the sake of clarity the various network connections (which may be wireless or wired) have been removed. As illustrated, an environment includes two rooms 302(*a*) and 302(*b*), which are adjacent and share a wall or other partition. Each room may have one or more doorways, windows, or other access portals as shown. One or more static location triggers 310 and/or dynamic location triggers 320 are located within rooms 302(*a*) and/or rooms 302(*b*), as shown.

Two readers are present in this environment (although a practical example might have many more). One reader 108(*a*) and its associated antenna 106(*a*) are located in room 302(*a*). Antenna 106(*a*) has a range 116(*a*). Another reader 108(*b*) is and its associated antenna 1069*b*) is located in room 302(*b*). Antenna 106(*b*) has a range 116(*b*). In this example, the ranges 116(*a*) and 116(*b*) partially overlap, as will often be the case.

Asset 202 resides in room 302(*a*), and is within range 116(*a*) of reader 108(*a*). At the same time, however, asset 202 is within range 116(*b*) of reader 108(*b*). Readers 108(*a*) and (*b*) might be capable of reading RFID tags of the same or different types, and might be mobile or stationary. Thus, the set of tag IDs that will be read by 108(*b*) will contain at least one member of the set of tag IDs that will be read by 108(*a*). Stated another way, the two sets are not disjoint. When this tag information is communicated over the network to RF switch 110, RF switch 110, RF switch examines this information and reconciles the location of the asset based on the information it knows at that time (and is therefore "opportunistic").

Locationing, as performed by the RF switch, generally involves examining all of the RFID tag data available at a particular time and then using rules and a locationing algorithm to determine the most likely location of the tags associated with the tag data. The locationing algorithm is advantageously modified in accordance with information received from location triggers 310 and 320.

For example, if a particular tag ID is read by multiple RFID readers, then the RF switch will intelligently choose the most likely location based on what it knows at that time. For example, if a tag ID is read by both a short-range mobile reader that exists in a particular room and a long-range active-RFID-reader that is fairly far away from that room, the system will conclude that it the tag is most likely located in the room (i.e., rather than near the long-range reader).

In accordance with one aspect, RF switch reconciles the information based on what it knows about the RFID readers. For example, it may know the location of 108(*a*), either because it is a stationary reader, or because it has other knowledge of the reader's whereabouts (e.g., GPS information).

In accordance with another embodiment, the RF switch is configured to reconcile the location of the asset based on a time of arrival associated with the RF readers. Based on tag ID as read by any reader coupled to the RF network, the RF switch locationing engine (including any combination of hardware/software/firmware resident within the switch) can determine its location. This is particularly useful for combination tags (i.e., multiple tag types on a single asset) because many times one type of tag may not be visible to any reader on the network.

In accordance with another embodiment, the RF switch is configured to reconcile the location of the asset based on triangulation and/or trilateration. That is, the signal strength from three separate readers to a particular RF tag may be used to infer the position of an asset to which the tag is attached.

In accordance with another embodiment, the RF switch is configured to reconcile the location of the asset based on a floor map (i.e., a map of the location of RFID readers) and/or an RFID zone map (i.e., a map of the location of particular zones associated with a number of readers). That is, the RF switch maintains a hashed link data structure for tags within a particular read point in the RF network. It also maintains a zone map and logical reader configuration (as configured runtime, or statically by an administrator or a software application.) The locationing engine within the RF switch then uses time of arrival information and tag-type-specific algorithms to determine the location of the tag.

Location triggers 310 and 320 include suitable hardware/software configured to transmit to the RF switch specific location information that can be used to improve the locationing algorithm. Such triggers might include, for example, an RFID tag, a Zigbee tag, an 802.11 device, or an 802.11 tag. Static location triggers 310 are substantially fixed within the environment, but may be moved to various locations as required. Triggers 310 are configured at any given time such that they "know" their current position within the environment, and can intermittently or otherwise send their current position to the locationing module within the RF switch. In this regard, static location triggers 310 may include WiFi and/or RF tag components.

Dynamic location triggers 320, however, include suitable hardware and/or software within a portable WiFi-enabled device such as a cell phone, PDA, handheld computer, or the like. Such triggers 320 may include a user interface that allows a user to type in a specific position. Thus, for example, a user may carry trigger 320 to the location of an asset and type in the correct position (or have it computed automatically from a GPS component), and that correct position will be sent to the RF switch.

Regardless of the type of trigger 310, 320, the locationing algorithm uses the received information to alter the method used for opportunistic locationing. Thus, for example, if the system believes that an asset is at a coordinate (e.g., 25,50) and it receives information from a location trigger that specifies that the asset is at a different coordinate (e.g., 29, 40), then the algorithm adjusts its parameters based on all or some of the location trigger information that it has received.

Location determination involves various ranging techniques to determine symbolic distance or range measurement coupled with position estimation techniques that derive position estimates from collection of reference points and their associated range measurements. For ranging techniques, the distance of the object is computer from the AP as a proportion of effective RSSI, where effective RSSI is the RSSI as seen by the AP adjusted for facility layout (e.e.g, size, RF barriers etc. as specified by the user), fingerprinting info if available, runtime RF environmental characteristics as available from the AP (Signal to noise ratio, AP to AP beacon, Ap power, etc). And then standard triangulation may be used as the position estimation technique. As is known in the art, with respect to triangulation, if the distance to three known locations is known, the absolute position in 2D can be determined by the section of the three circles around these locations.

Using the location triggers 310, 320, the system knows the exact location of an asset, so the system makes adjustment to the position technique such that it maps effective RSSI to distance and changes the calculation or parameters so that all future locations are calculated more accurately. As there can be more than one location trigger, the system makes use of standard deviation in calculating location for each trigger and then use this standard deviation in the formula to compute the location. This way location is determined in a range for each object.

One advantage of this method of using location triggers or 'smart surroundings' is that the system adjusts itself automatically when the RF properties of the facility or environment changes. RF is variable in a facility, especially with features such as self healing, where Access Port powers are changed during runtime. Algorithms such as fingerprinting—where RSSI values from various APs are pre-established (calibrated) at each point in the facility and then the location of an object is computed by performing a lookup of the object's RSSI and corresponding lookup in this pre-calibrated table—fail if the AP powers and RF properties in the environment have changed.

It should be appreciated that the example embodiment or embodiments described herein are not intended to limit the scope, applicability, or configuration of the invention in any way. For example, these methods may be used in connection with standard barcode readers and the like. In general, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A radio frequency identification (RFID) system comprising:
   a location trigger configured to transmit a trigger location;
   a first RFID reader coupled to the network and having a first antenna associated therewith, the first reader configured to read a first set of tag IDs within a first range of the first antenna;
   a second RFID reader coupled to the network and having a second antenna associated therewith; the second RFID reader configured to read a second set of tag IDs within a second range of the second antenna;
   an RF switch coupled to the network and configured to receive the trigger location, and to receive the first set of tag IDs and the second set of tag IDs from the first RFID reader and the second RFID reader;
   the RF switch configured to reconcile, using a locationing algorithm dependent on the ranges of the RFID readers, the location of an asset having a particular tag ID when the particular tag ID is an element of both the first set of tag IDs and the second set of tag IDs, wherein if the location trigger specifies that an asset including the particular tag ID is at different coordinates than determined by the locationing algorithm, then the locationing algorithm is modified to bias a location of the asset towards the trigger location received by the RF switch.

2. The RFID system of claim 1, wherein the RF switch is configured to reconcile the location of the asset based on an operating range of the first RFID reader and the second RFID reader, wherein a location of an asset including the particular tag ID is biased towards a location of the RFID reader having the shortest range.

3. The RFID system of claim 1, wherein each of the RFID tags has an associated type, the type being selected from a group consisting of passive tags, active tags, and semi-active tags, wherein if the particular tag ID is of a passive tag, a location of an asset including the particular tag ID is biased towards a location of the RFID reader able to read the passive tag.

4. The RFID system of claim 1, wherein the locationing algorithm is further modified to map effective received signal strength to distance using the location triggers to calibrate future location calculations.

5. The RFID system of claim 1, wherein the first RFID reader is selected from the group consisting of a mobile RFID reader, a stationary RFID reader, and a wireless access port.

6. A method for locationing of an asset comprising:
   providing a first RFID reader coupled to the network and having a first antenna associated therewith,
   providing a second RFID reader coupled to the network and having a second antenna associated therewith;
   providing a location trigger;
   reading a first set of tag IDs within a first range of the first antenna;
   reading a second set of tag IDs within a second range of the second antenna;

receiving the first set of tag IDs and the second set of tag IDs from the first RFID reader and the second RFID reader;

receiving a trigger location from the location trigger; and reconciling the location of an asset having a particular tag ID when the particular tag ID is an element of both the first set of tag IDs and the second set of tag IDs using a locationing algorithm dependent on the ranges of the RFID readers, wherein if the location trigger specifies that an asset including the particular tag ID is at different coordinates than determined by the locationing algorithm, then the locationing algorithm is modified to bias a location of the asset towards the trigger location.

7. The method of claim 6, wherein reconciling the location of the asset includes processing an operating range of the first RFID reader and the second RFID reader, wherein a location of an asset including the particular tag ID is biased towards a location of the RFID reader having the shortest range.

8. The method of claim 7, wherein each of the RFID tags has an associated type, the type being selected from a group consisting of passive tags, active tags, and semi-active tags, wherein if the particular tag ID is of a passive tag, a location of an asset including the particular tag ID is biased towards a location of the RFID reader able to read the passive tag.

9. The method of claim 7, wherein the locationing algorithm is further modified to map effective received signal strength to distance using the location triggers to calibrate future location calculations.

* * * * *